US007814021B2

(12) United States Patent
Stamos et al.

(10) Patent No.: US 7,814,021 B2
(45) Date of Patent: *Oct. 12, 2010

(54) MANAGED DISTRIBUTION OF DIGITAL ASSETS

(75) Inventors: Nicholas Stamos, Belmont, MA (US); Seth N. Birnbaum, Boston, MA (US); Tomas Revesz, Jr., Waltham, MA (US); Donato Buccella, Watertown, MA (US); Keith A. MacDonald, Watertown, MA (US); Dwayne A. Carson, Mendon, MA (US); William E. Fletcher, Acton, MA (US)

(73) Assignee: Verdasys, Inc., Waltham, MA (US)

( * ) Notice: Subject to any disclaimer, the term of this patent is extended or adjusted under 35 U.S.C. 154(b) by 1031 days.

This patent is subject to a terminal disclaimer.

(21) Appl. No.: 10/706,871

(22) Filed: Nov. 12, 2003

(65) Prior Publication Data

US 2005/0060537 A1     Mar. 17, 2005

Related U.S. Application Data

(60) Provisional application No. 60/442,464, filed on Jan. 23, 2003.

(51) Int. Cl.
*G06F 21/00* (2006.01)
(52) U.S. Cl. .................. 705/57; 705/51; 705/52; 705/54
(58) Field of Classification Search .............. None
See application file for complete search history.

(56) References Cited

U.S. PATENT DOCUMENTS

| 5,032,979 A | 7/1991 | Hecht et al. |
| 5,636,643 A | 6/1997 | Argenta et al. |
| 5,645,081 A | 7/1997 | Argenta et al. |
| 5,666,411 A * | 9/1997 | McCarty ...................... 705/51 |
| 5,692,124 A * | 11/1997 | Holden et al. .................. 726/2 |

(Continued)

FOREIGN PATENT DOCUMENTS

DE    20 2004 017 052 U1    6/2005

(Continued)

OTHER PUBLICATIONS

Kirichenko, A., "F-Secure Kernel Mode Cryptographic Driver, FIPS 140-2 Validation Security Policy," F-Secure Corp., Dec. 2001 entire document, cs-www.ncsi.nist.gov/cryptval/140-1/140sp/140sp237.pdf.

(Continued)

*Primary Examiner*—Andrew J. Fischer
*Assistant Examiner*—Joshua Murdough
(74) *Attorney, Agent, or Firm*—Hamilton, Brook, Smith & Reynolds, P.C.

(57) ABSTRACT

A technique for establishing usage control over digital assets such as computer files. The system model not only tracks authorized users' access to files, but monitors passage of such files to uncontrollable removable storage media or through network connections and the like which may indicate possible abuse of access rights. In accordance with a preferred embodiment, an autonomous independent agent process running at a point of use, such a background process in a client operating system kernel, interrupts requests for access to resources. The agent process senses low level system events, filters, and aggregates them. A policy engine analyzes sequences of aggregate events to determine when policy violations occur.

22 Claims, 10 Drawing Sheets

U.S. PATENT DOCUMENTS

| | | | |
|---|---|---|---|
| 6,427,140 | B1 | 7/2002 | Ginter et al. |
| 6,510,513 | B1 * | 1/2003 | Danieli ............... 713/156 |
| 6,648,862 | B2 | 11/2003 | Watson |
| 7,160,273 | B2 | 1/2007 | Greter et al. |
| 7,165,174 | B1 | 1/2007 | Ginter et al. |
| 7,281,020 | B2 | 10/2007 | Fine |
| 2001/0042043 | A1 * | 11/2001 | Shear et al. ............. 705/51 |
| 2002/0028155 | A1 | 3/2002 | Dolecek et al. |
| 2002/0178271 | A1 | 11/2002 | Graham et al. |
| 2003/0051026 | A1 * | 3/2003 | Carter et al. ............. 709/224 |
| 2003/0120935 | A1 * | 6/2003 | Teal et al. ............... 713/188 |
| 2003/0145235 | A1 | 7/2003 | Choo |
| 2004/0039809 | A1 | 2/2004 | Ranous et al. |
| 2004/0054894 | A1 | 3/2004 | Lambert |
| 2004/0255160 | A1 | 12/2004 | Stamos et al. |
| 2008/0009812 | A1 | 1/2008 | Riesinger |

FOREIGN PATENT DOCUMENTS

| | | |
|---|---|---|
| DE | 10 2005 014 420 A1 | 9/2006 |
| EP | 0 620 720 | 10/1994 |
| EP | 1 184 042 A1 | 3/2002 |
| GB | 2 378 734 A | 2/2003 |
| JP | 11-017915 A | 1/1999 |
| JP | 2001-184264 A | 7/2001 |
| WO | WO 93/09727 | 5/1993 |
| WO | WO 96/40026 | 12/1996 |
| WO | WO 97/18007 | 5/1997 |
| WO | WO 00/14499 | 3/2000 |
| WO | WO 03/016719 A1 | 2/2003 |
| WO | WO 03/018098 A2 | 3/2003 |
| WO | WO 03/057070 A2 | 7/2003 |
| WO | WO 2006/100053 A3 | 9/2006 |
| WO | WO 2007/013064 A1 | 2/2007 |

OTHER PUBLICATIONS

Reid, Jason F., et al., DRM, Trusted Computing and Operating System Architecture', 2005, Information Security Research Centre, Queensland Univer. of Technology, entire document, 'http://crpit.com/confpapers/CRPITV44Reid.pdf'.

"Planning for CA-ACF2 Migration to OS/390 Security Server (RACF)," *IBM International Technical Support Organization*, Poughkeepsie, NY, 1$^{st}$ ed. (1996).

Wespi, A., et al., "Intrusion Detection Using Variable-Length Audit Trail Patterns," *RAID* 2000, H. Debar, L. Mé, eds. (Berlin Heidelbergp: Springer-Verlag ), pp. 110-129 (2000).

Chari and Cheng, "BlueBoX: A Policy-Driven, Host-Based Intrusion Detection System," Proceedings of the Network and Distributed System Security Symposium, San Diego, California, USA (2002).

Lunt, T.F. et al., "A Real-Time Intrusion-Detection Expert System (IDES)," (SRI Project 6784). Washington, D.C.: SPAWAR (Feb. 1992).

"HIBUN/Enterprise," Open Space HAND Library, p. 18, Hitac2003-1, (mechanical English translation).

* cited by examiner

| Action Type | Level | Event Category | Event Name | Event Table | Action Detail Field | Action Detail Value | Discriminant |
|---|---|---|---|---|---|---|---|
| 1 | Low | File | FileRead | FileEvent | operationType | 0 | bytesRead > 0, bytesWritten = 0 |
| 2 | Low | File | FileWrite | FileEvent | operationType | 0 | bytesRead = 0, bytesWritten > 0 |
| 3 | Low | File | FileReadWrite | FileEvent | operationType | 0 | bytesRead > 0, bytesWritten > 0 |
| 4 | Low | File | FileCopy | FileEvent | operationType | 1 | |
| 5 | Low | File | FileRename | FileEvent | operationType | 2 | |
| 6 | Low | File | FileDelete | FileEvent | operationType | 3 | |
| 7 | Low | File | FileMove | FileEvent | operationType | 4 | |
| 8 | Low | File | FileRecycle | FileEvent | operationType | 5 | |
| 9 | Low | File | FileRestore | FileEvent | operationType | 6 | |
| 10 | Low | Network | TCPIPInbound | NetworkEvent | protocolType | TCPIP | isOutbound = 0 |
| 11 | Low | Network | TCPIPOutbound | NetworkEvent | protocolType | TCPIP | isOutbound = 1 |
| 12 | Low | Network | UDPInbound | NetworkEvent | protocolType | UDP | isOutbound = 0 |
| 13 | Low | Network | UDPOutbound | NetworkEvent | protocolType | UDP | isOutbound = 1 |
| 14 | Low | Network | IPSECInbound | NetworkEvent | protocolType | IPSEC | isOutbound = 0 |
| 15 | Low | Network | IPSECOutbound | NetworkEvent | protocolType | IPSEC | isOutbound = 1 |
| 16 | Low | Print | Print | PrintEvent | (implied) | N/A | |
| 17 | Low | CD | CDRead | CDEvent | operationType | 1 | |
| 18 | Low | CD | CDWrite | CDEvent | operationType | 2 | |
| 19 | Low | Clipboard | ClipboardCutCopy | ClipboardEvent | eventType | CutCopy | |
| 20 | Low | Clipboard | ClipboardPaste | ClipboardEvent | eventType | Paste | |
| 21 | Low | User | UserLogon | UserEvent | eventType | Logon | |
| 22 | Low | User | UserLogoff | UserEvent | eventType | Logoff | |
| 23 | Low | Machine | Machine | MachineEvent | eventType | ... | Skip the Machine events |

FIG. 4A

|    |      | Process    | ProcessStart            | Process        | (Implied) | Use processStartDtTm |
|----|------|------------|-------------------------|----------------|-----------|----------------------|
|    |      | Process    | ProcessEnd              | Process        | (Implied) | Use processEndDtTime |
| 24 | Low  |            |                         |                |           |                      |
| 25 | Low  |            |                         |                |           |                      |
| 26 | High | File       | FileEdited              | AggregateEvent |           |                      |
| 27 | High | File       | FileCopied              | AggregateEvent |           |                      |
| 28 | High | File       | FileSaveAs              | AggregateEvent |           |                      |
| 29 | High | File       | FileLeftThroughRemovableMedia | AggregateEvent |     |                      |
| 30 | High | Clipboard  | ClipboardToFile         | AggregateEvent |           |                      |
| 31 | High | Print      | PrintFile               | AggregateEvent |           |                      |
| 32 | High | CD         | BurnMaster              | AggregateEvent |           |                      |
| 33 | High | CD         | BurnFile                | AggregateEvent |           |                      |
| 34 | High | Network    | FileLeftThroughNetworkPort | AggregateEvent |        |                      |
| 35 | High | Network    | EmailFile               | AggregateEvent |           |                      |
| 36 | High | Network    | RemoteAccess            | AggregateEvent |           |                      |
| 37 | High | Network    | InstantMessenger        | AggregateEvent |           |                      |
| 38 | High | Network    | P2PApp                  | AggregateEvent |           |                      |
| 39 | High | Network    | FTPFile                 | AggregateEvent |           |                      |
| 40 | High | Network    | TunnelOut               | AggregateEvent |           |                      |
| 41 | High | Network    | TunnelIn                | AggregateEvent |           |                      |
| 42 | High | Network    | TunnelInOut             | AggregateEvent |           |                      |
| 43 | High | Network    | FileOutThroughTunnel    | AggregateEvent |           |                      |

FIG. 4B

| Event Name | Constituent Event Types | Pattern | Scope |
|---|---|---|---|
| FileEdited | FileRead, FileWrite, FileReadWrite | Same processid and fileHandle. beforeHash of first read & afterHash of last write differ. Both reads and writes to same fileHandle. Sum of writes > 0. | Thread |
| FileCopied | FileRead, FileWrite, FileReadWrite, FileCopy | Command shell: Alternating reads & writes. The reads all have one filehandle, the writes all have a second one.<br><br>Explorer: A long series of reads from one filehandle followed by a long series of writes to a second. Miind the time period between. | Thread |
| FileSaveAs | FileRead, FileWrite, FileReadWrite | An app reads one or more files then writes a file. | Process |
| FileLeftThroughRemovableMedia | FileRead, FileWrite, FileReadWrite, FileCopy | Same as FileCopied or FileSaveAs, but target device is removable. | Process |
| ClipboardToFile | ClipboardCutCopy, ClipboardPaste | Pair a ClipboardCutCopy with all subsequent Clipboard Paste events for that user login until the next copy or the user logs out.<br><br>Problem: If the user closes the application that performed the copy and the object was large and the user opts not to keep it there, what happens ? | Login |

FIG. 5A

| | | | |
|---|---|---|---|
| PrintFile | Print, possibly others | Unclear. If there are temp files, intermediate PDF files, etc. then we may perform a chain of custody analysis to figure out just what was printed. | Thread |
| BurnMaster | FileRead, FileWrite | An app known to burn files reads one or more files then writes a file. | Process |
| BurnFile | CDWrite, FileRead | Application is recognized as a CD writing app. (Optional) Series of FileReads from one fileHandle, followed by a series of CDWrite events with the same process. May need to compare filenames, otherwise one read will exhaust all the writes. Alternately, all read files are lumped together with one large burn event. Or perhaps the first read of a new file after the last read from the previous file is the start of the next burn event. | Process |
| FileLeftThroughNetworkPort | FileRead, TCPIPInbound, TCPIPOutbound, UDPInbound, UDPOutbound, IPSECInbound, IPSECOutbound | An overlapping stream of FileReads interspersed with Inbound and Outbound network events.<br><br>All the network events should be for the same port (?) and to a destination NOT on localhost.<br><br>All the network events should be for the same protocol. | Thread |
| EMailFile | FileRead, TCPIPInbound, TCPIPOutbound, (other protocols???) | Similar to FileLeftThroughNetworkPort. Combines all interleaving FileReads with the network events.<br>The application image name is one of those known to be an email program.<br>May place constraints on the ports, since many emailers use certain well defined ports for SMTP, POP, etc. | Process |

FIG. 5B

| | | |
|---|---|---|
| InstantMessenger | FileRead, TCPIPInbound, TCPIPOutbound | Similar to FileLeftThroughNetworkPort. Combines all interleaving FileReads with the network events. The application image name is one of those known to be used for instant Messanger. May place constraints on the ports. | Process |
| P2PApp | FileRead, TCPIPInbound, TCPIPOutbound, UDPInbound, UDPOutbound, IPSECInbound, IPSECOutbound | Constrain the application name to be one of those known to be a P2PApp. Multiple ports will be used; some or all of them may have constraints. May constrain the protocol per app or per instance. Similar to FileLeftThroughNetworkPort as concerns interleaved file reads. | Process |
| FTPFile | FileRead, FileWrite, TCPIPInbound, TCPIPOutbound | May want to split into two events, one for reading and one for writing. Constrain to the common FTP port, unless the app is known by name to be an FTP client. Like FileLeftThroughNetworkPort, look for interleaved reads and network events, or interleaved writes and network events. | Process |
| RemoteAccess | TCPIPInbound, TCPIPOutbound, UDPInbound, UDPOutbound, IPSECInbound, IPSECOutbound | Do not incorporate FileRead events. Several ports may be used. Look for known image names of remote apps. | Process |

FIG. 5C

| | | |
|---|---|---|
| TunnelOut | TCPIPInbound, TCPIPOutbound, UDPInbound, UDPOutbound, IPSECInbound, IPSECOutbound. | All events use same protocol. Only two processes used. Two different apps and four ports are used. One of the ports is remote.<br>Event 1: The first app sends outbound from local port 1 to local port 2.<br>Event 2: The second app (the tunneler) receives inbound from local port 1 to local port 2.<br>Event 3: The tunneler also sends from local port 3 to remote port 4. Both events of the tunneler share the same thread (probably). | Login |
| TunnelIn | TCPIPInbound, TCPIPOutbound, UDPInbound, UDPOutbound, IPSECInbound, IPSECOutbound | All events use same protocol. Only two processes used. Two different apps and four ports are used. one of the ports is remote.<br>Event 1: The first app (the tunneler) receives inbound from remote port 1 to local port 2.<br>Event 2: The tunneler sends outbound from local port 2 to local port 3.<br>Event 3: The second app also receives inbound from local port 3 to local port 4.<br>Both events of the tunneler share the same thread (probably). | Login |
| TunnelInOut | TCPIPInbound, TCPIPOutbound, UDPInbound, UDPOutbound, IPSECInbound, IPSECOutbound | Multiple protocols may be used. More research needed. More than three ports are used. | Login |
| FileLeftThroughTunnel | FileRead, TunnelOut | Similar to FileLeftThroughNetworkPort. Combines all interleaving FileReads involving a process that is participating in a TunnelOut event.<br>If more than one file is read, the source destination will be a count of the files read. | Login? |

MANAGED DISTRIBUTION OF DIGITAL ASSETS

RELATED APPLICATION

This application claims the benefit of U.S. Provisional Application No. 60/442,464 entitled "Method and System for Adaptive Identification and Protection of Proprietary Electronic Information," filed on Jan. 23, 2003. The entire teachings of the above-referenced application are hereby incorporated by reference.

BACKGROUND OF THE INVENTION

Data security has been a significant issue facing system administrators since almost the inception of the data processing industry. Most computer users recognize the possibility of theft or misuse of data by unauthorized outsiders. The terms "hackers" and "crackers" are often used to describe outsiders who attempt to gain access to a system, and who are typically not involved in any way with an organization's operations, its internal employees or systems. Many different solutions already exist to protect an organization's data processing infrastructure from this kind of threat. These include physical access control, firewalls, sniffers and other network monitors, data encryption, intrusion detection systems and other solutions. These solutions are generally recognized as being adequate for their intended purpose most of the time.

However, there is a second class of computer users that also pose a security threat. Protection from these unauthorized insiders requires a different approach, but one that is also well known. Almost since the inception of disk-based storage systems, the concept of access control has been applied to limit the ability of certain users to access certain important files. Using these techniques, now a universal feature of almost every Operating System (OS), a desktop and/or network file server can provide for limited read, write, public, private and other types of access to files, directory structures and the like, depending upon permissions granted to particular users. Permissions can be attached to user accounts by a system administrator, based on the need to know, the departments in an organization of which a user is a member, and so forth.

Even when users obtain access to only a portion of a system, however, they can still use a variety of techniques to steal and/or damage information. These can include simple browsing for unsecured information in a network, and/or removal or deletion of information made available as a result of poor security practices. More sophisticated rogue insiders will employ network packet sniffers and/or spying software. A variety of approaches, such as centralized document and digital rights management systems, network auditing, and file management tools, can be effective tools against unauthorized use by insiders in some instances.

For example, U.S. Pat. No. 6,510,513 issued to Danieli and assigned to Microsoft Corporation describes a security and policy enforcement system that utilizes a series of transactions between a server and a client using electronic security certificates. A first client generates a request for access to data by submitting a security certificate containing a digest to a trusted arbitrator server. The trusted arbitrator authenticates the first client's credentials and returns the security certificate. The data and security certificate are then combined to create a distribution, which, in turn, is acquired by a second client. The second client extracts the security certificate and generates a digest from the data in the distribution. If the digest from the second client matches the digest from the first client, then data is considered to be valid. Depending upon the certificate type and a policy level, the trusted arbitrator server can provide services such as notification of improper usage.

U.S. Pat. No. 6,427,140 assigned to Intertrust Technologies is another type of digital rights management system. A system such as this was intended, however, to protect the rights of various participants in a transferring sensitive data, such as in an electronic commerce or other electronic facilitated transactions.

SUMMARY OF THE INVENTION

Neither of these solutions does much to protect misuse of information by authorized insiders. This class of users has a trusted status, as they are supposed to have access to important data files to carry out their assigned tasks. Thus, they are routinely granted permission to use such information on a daily basis. Their access to sensitive data therefore is not normally suspect. The problem comes when this class of trusted users abuse that trust—by copying and then distributing sensitive information to outsiders or other unauthorized people. Such events can happen quite easily, and has been occurring with increasing frequency when a disgruntled or departing employee wishes to damage an organization.

What prior art security systems fails to account for is the fact that once granted access to sensitive information, it is quite easy for authorized users to distribute it in many different ways. The proliferation of Internet connections, e-mail, instant messaging, removable media storage devices, such as Compact Disk-Read Write (CD-RW) drives, Universal Serial Bus (USB) type memory and storage devices, and the like, make it a trivial task to copy vast amounts of information almost instantaneously. Other peripheral devices, such as wireless modems, wireless local network cards, portable computers, Personal Digital Assistants (PDAs), network tunnels, and the like, provide all too convenient vehicles by which an authorized user may distribute copies of files outside of the trusted system environment.

Even the most sophisticated file management systems cannot presently prevent such abuse. The root of the problem stems from the fact that once an authorized user opens a file, its contents are no longer controllable. Specifically, copies of the file contents may be taken "out of" the controlled environment of a network or file management system all too easily.

The present invention is intended to address security problems that originate when authorized users abuse their authority. The invention accomplishes this by restricting access at the point of use of a file, rather than simply controlling access at a storage point.

Specifically, an autonomous, independent agent process, such as running in the background of a client Operating System (OS) kernel, interrupts requests for access to resources. Such resource access requests may include, for example, requests to read a file, open a network connection, mount a removable media device, and the like. Since access is detected at the point of use, in the OS kernel interrupt mechanism, tracking of resource utilization will occur regardless of whether the original directly access request originated from an application program that is being executed by an end user, indirectly by applications on behalf of users, or even by system requests made independently of application software.

The autonomous independent agent process contains sensors that capture low level system events. These sensors may include operations such as file read, file write, file copy, clipboard cut, clipboard copy, CD-RW access, TCP/IP network message inbound, TCP/IP network message outbound and the like.

Low level events are then associated with one or more file names (handles) and filtered against an approved list. Thus, the raw events are filtered to remove references to files such as operating system files (.EXE, .DLL, etc. in the case of Microsoft Windows) and the like that do not contain sensitive application data. Only events relating to application files that may contain sensitive data are thus further tracked.

For example, an aggregate "FileEdit" event might be reported when a user has opened and modified a sensitive financial document, with that user then attempting to save it to a newly attached USB portable hard drive.

Other aggregate events can provide control over user access to files, applications, networks and peripheral bus interfaces. Such aggregate events are typically defined by a system administrator to actively enforce policies governing the acceptable use of system resources. Enforcement can then take place at the time and place of information access, via the agent process.

For example, the administrator may develop logic predicates that control the use of desktop applications, networks and interfaces that are otherwise unmanaged conduits for information leakage. These predicates may prevent, restrict, or require documentation for access to peripheral devices that are capable of storing massive amounts of information, such as Universal Serial Bus (USB), hard disk drives, Compact Disk-Read Write (CD-RW) burners, Instant Messaging (IM) applications and peer-to-peer network connections. Policies governing the use of these resources can be as detailed as required by the organization. Thus, the agent process' response to policy violations can be aggressive as the assessed risk demands, in accordance with the particular organization's requirements. The autonomous disconnected operation of the access control allows enforcements of policies to be carried out in a way that is as mobile as the user's other system.

Specific enforcement options can include: allowing the user action with a prompt for required user input (such as specifying a business justification); blocking the user action, or generation of a warning and/or an alert to a compliance or security manager. Optional warnings to a user and/or prompts for input reinforce the user's understanding and acceptance of acceptable use policies.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A and 4B are a table of possible low level atomic events and higher level aggregate events.

DETAILED DESCRIPTION OF A PREFERRED EMBODIMENT

Figure 1:
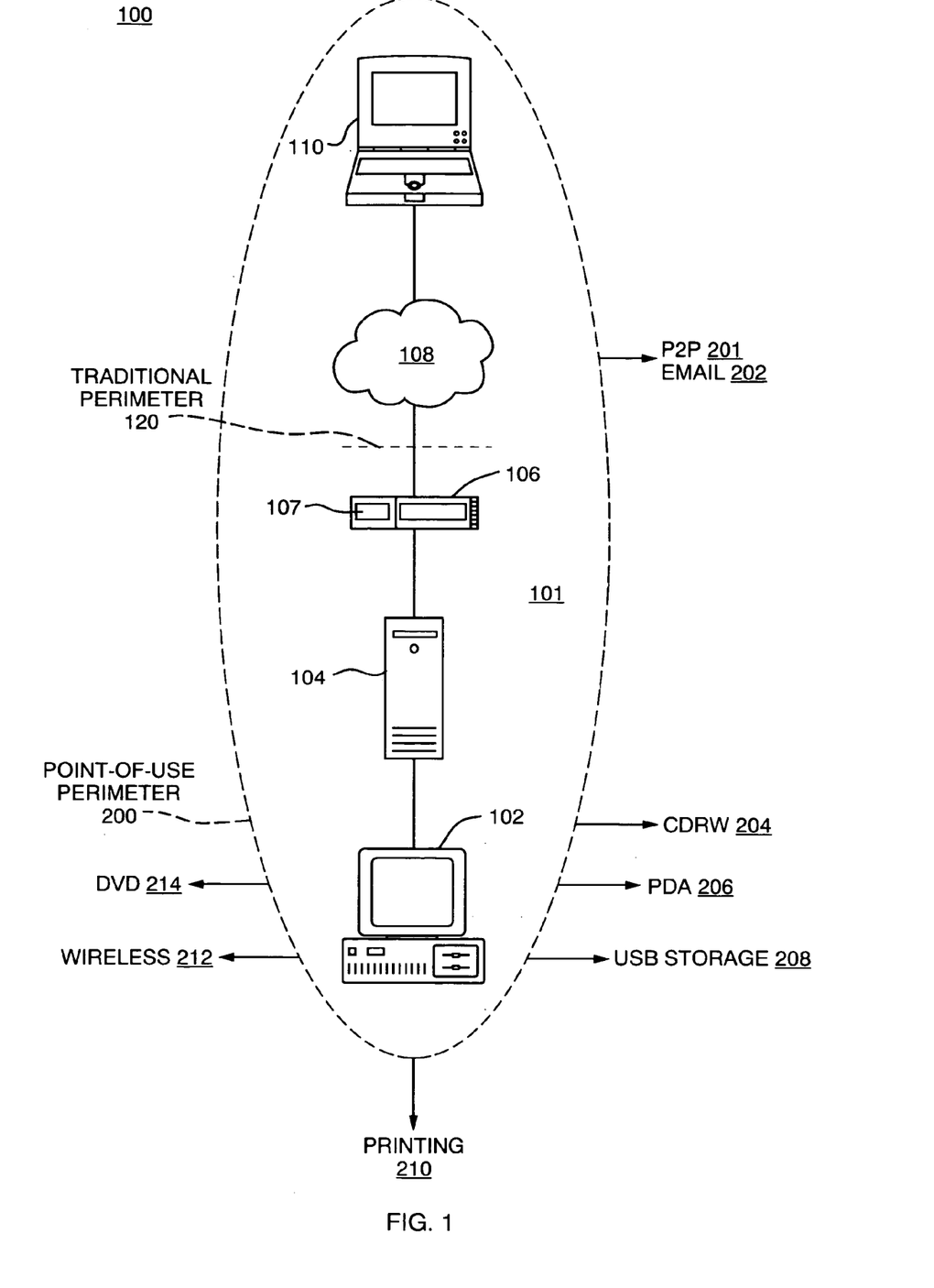
FIG. 1 is a diagram illustrating traditional security perimeters in a data processing system and a point of use perimeter that can be implemented with the present invention.

FIG. 1 is a diagram of a typical computer network 100 which consists of client devices 102 and servers 104 connected via local area network and/or inter-networking equipment. Connections to an outside network, such as the Internet 108, are made through devices such as routers or gateways 106. Connections through the Internet 108 can be also made to external computers 110.

Traditional security models attempt to prevent access by an untrusted outsider 110 to devices 102 and/or file servers 104 within the protected network 100. Thus, a network perimeter 120 is typically associated with network points of access, such as through router 106 and specifically at a firewall 107. The firewall 107 can thus prevent attempts by unauthorized users of outside computers 110 to access information stored in the server 104 or otherwise manipulate the local computers 102. Firewalls 107 can also establish a perimeter 120 for outgoing access such as, for example, by users attempting to access certain undesirable outside computers 110 that contain restricted or harmful websites, game servers, and the like.

Rather than establishing a perimeter at external points of physical access to a network, the present invention establishes a perimeter of accountability for file usage at the point of use. The accountability model can not only track authorized users of the computer 102 accessing files stored on a local server 104, but more importantly also monitors attempts to access or move such files to peripherals that distribute or record information, or other possible abuse events.

Such possible abuse events may occur whenever a user accesses devices which are not visible to or controllable by a local file server 104 or firewall 107. These events may include writing files to uncontrolled media such as Compact Disk-Read Write (CD-RW) drives 204, Personal Digital Assistants (PDA) 206, Universal Serial Bus (USB) storage devices 208, wireless devices 212, digital video recorders 214, or even printing of files. Other suspect events can include running external Peer-to-Peer (P2P) applications 201, sending files via external e-mail applications 202, running Instant Messaging (IM) applications, uploading files to web sites via the Internet 108, and the like. Thus, the invention can provide enterprise-wide monitoring of all file, application and network use. As will be understood shortly, the heart of this approach consists of a high level contextual stream that characterizes user activity as it occurs at the point of use, such as the desktop 102, and then potentially controlling its occurrence according to defined policies.

Figure 2:
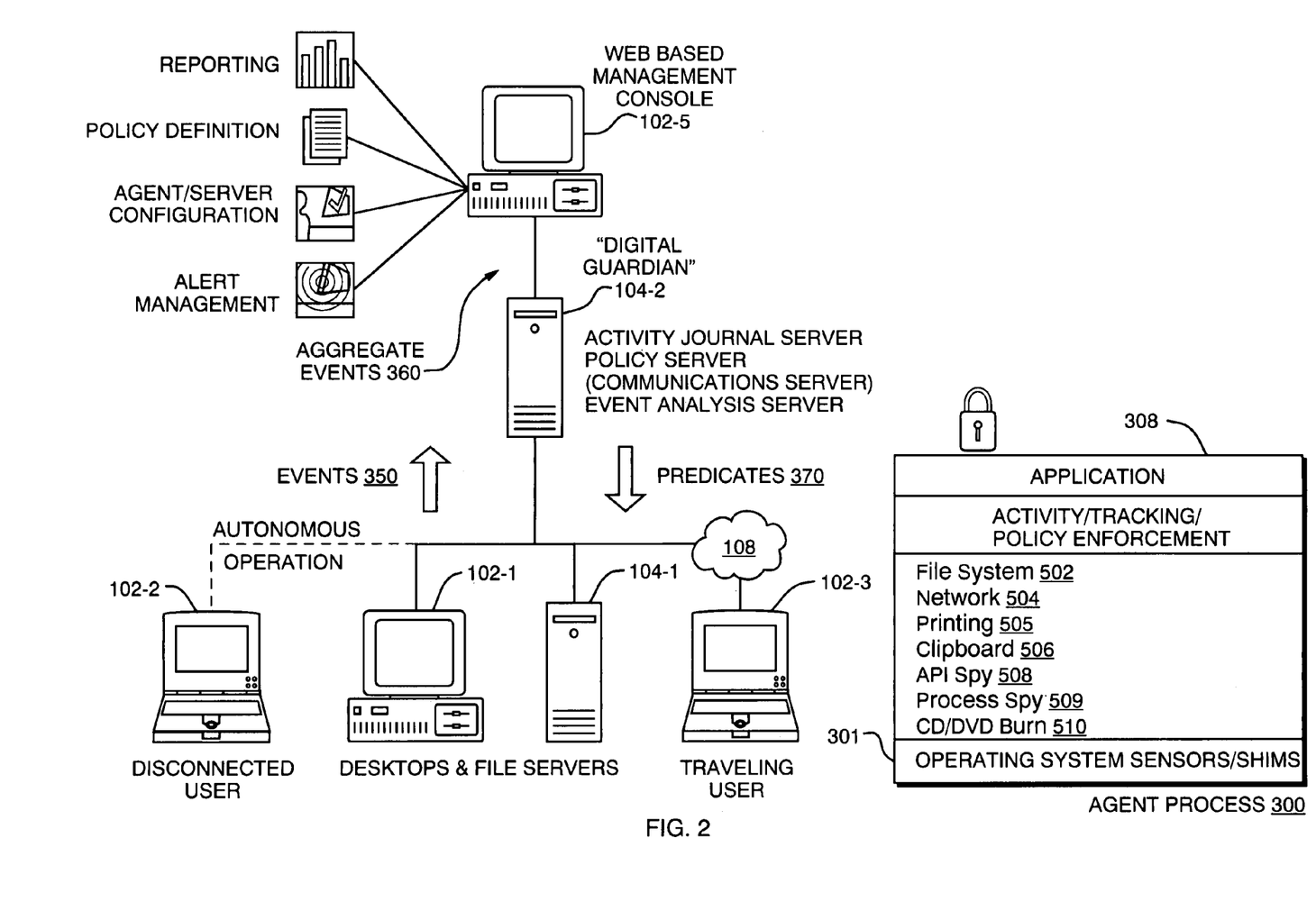
FIG. 2 is a diagram illustrating how a Digital Guardian™ server may provide policy predicates. (Digital Guardian™ is a trademark of VerdaSys, Inc., of Waltham, Mass.)

Turning attention to FIG. 2, the process for controlling distribution of digital assets will now be described in more detail. A first system component, called an agent process 300, is interposed between an Operating System (OS) 301 and applications 308 as they run on clients 102 and/or servers 104 within the network 101. The agent process 300 has sensors or shims to detect and track file, printing, clipboard, and I/O device operations, such as file read or write operations. These sensors may include, but are not limited to, file system sensor 502 (including CD/DVD burn sensor 510), network sensor 504, print sensor 505, clipboard sensor 506, API spy 508 and process spy 509.

While the clients normally include desktops 102-1 which have a direct wired (or wireless) connection 109 to the local network 101, the agent 300 may also run on disconnected client computers such as laptops 102-2, making a report of events once a connection is eventually made to the network 100.

The agent 300 reports atomic events 350 to an activity journaling process typically running on an activity journaling server 104-2. The journaling server 104-2 (also referred to herein as the Digital Guardian™) processes atomic event data and coalesces it into what are called aggregate events 360. Aggregate events 360 are detected when a certain predetermined sequence of atomic events occurs. Each aggregate event 360 is thus composed of one or more atomic events 350 that conform to some predetermined pattern indicative of activity that should be monitored.

Specific types and/or sequences of atomic events 350 that lead to aggregate events 360 will be described in detail later. It should be appreciated here, however, that the particular events reported and their aggregation types depend upon the specific activities sought to be monitored.

In addition, predicates 370 that define enforcement policies are forwarded to the agent process 300. These may originate from configuration commands entered at management console 102-5 and be sent through the Digital Guardian server 104-2.

To protect the network completely, the agent process 300 would typically reside on all desktops 102 and file servers 104 associated with an enterprise's networks. The activity journaling server 104 and agent process 300 may communicate through secure, networking based applications such as the Microsoft ".NET" infrastructure or other secure networking systems. The management console 102-5 also permits access to the database stored in the Digital Guardian server 104-2, and is used specifically to provide risk compliance, forensic reporting, and similar reports 310 to administrative users of the system.

The journaling server 104-2 may typically run within a Windows 2000 Server environment having a secure .NET framework. The journaling server 104-2 also has access to a database, such as Microsoft SQL Server 2000 for example, to provide record storage and retrieval functions. It is to be understood, of course, that the processes described herein can be implemented on other types of operating systems, server platforms, database systems, and secure networking environments.

Figure 3:
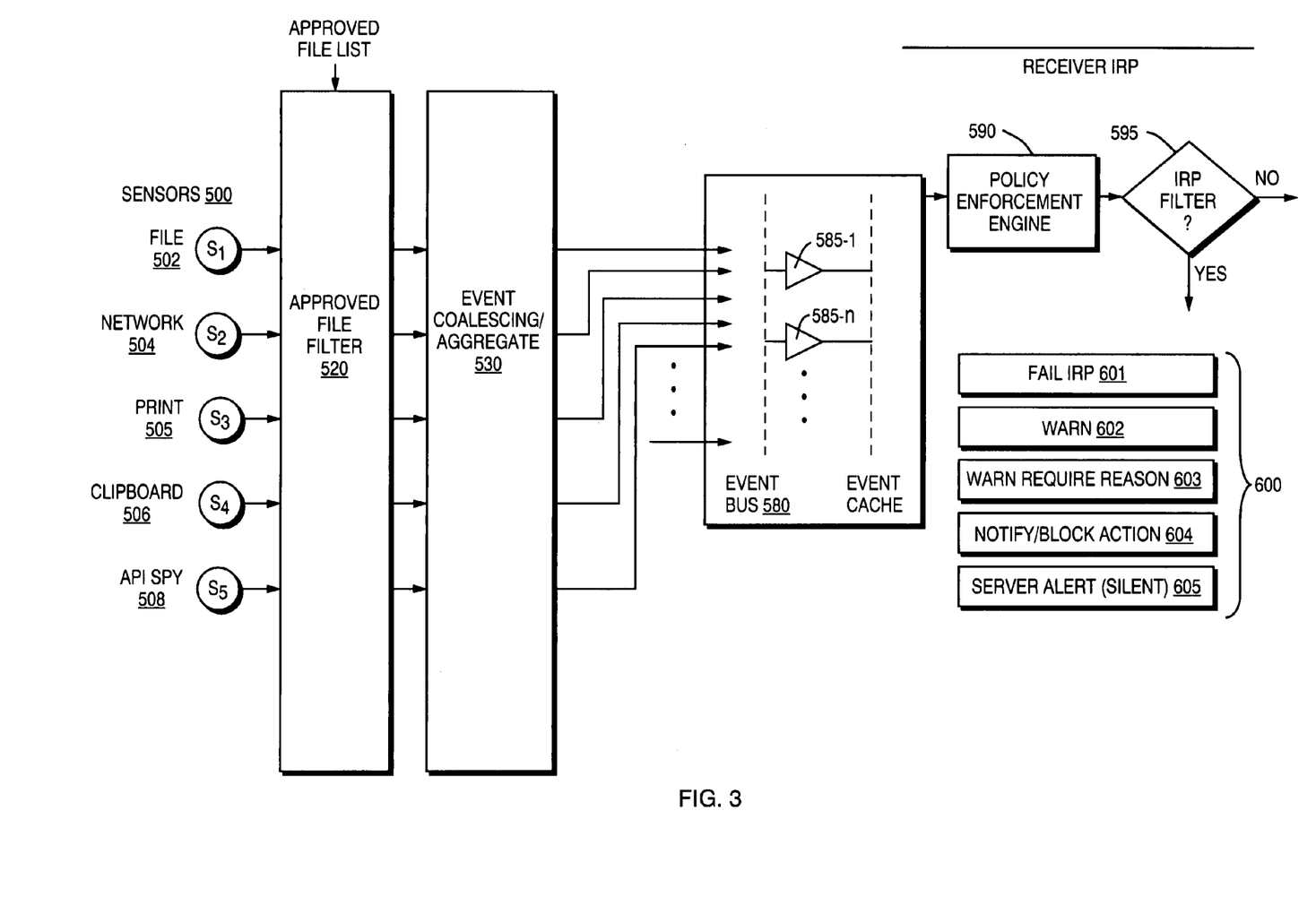
FIG. 3 is a process flow diagram illustrating the invention more particularly.

FIG. 3 is a more detailed view of the client agent 300. These elements particularly consist of one or more sensors 500, file filter 520, and event coalescing/aggregation 530, event bus 580, one or more policy predicates 585, policy enforcement engine 590, and I/O Request Packet (IRP) filter 595. It should be further noted that the agent process 300 can also provide real time evaluation and potentially enforcement of rules.

The agent 300 preferably runs as a kernel process in a client Operating System (OS). For example, the agent 300 may run within the kernel of Microsoft Windows 2000 or Windows XP. Autonomous operation of the agent 300 provides for detection of atomic events 350 even when client 102 is disconnected from the network 100. Any such events are reported when the client 102 is reconnected and can communicate with the Digital Guardian server 104-2.

In a preferred embodiment, the agent 300 will run multiple services under Windows so that if one service is stopped by a malicious user, the other one may restart the other process. The process is also hid from a task manager or similar processes in the operating system and will be able to work with safe mode boot features in order to guarantee full protection.

Atomic event sensors 500 report atomic events as an output when actions, typically associated with Input/Output (I/O) drivers, are intercepted at the OS kernel. The agent process 300 is therefore transparent to the end user and tamper resistant. The intercept may, for example, occur during an I/O Request Packet (IRP) in an interruptible kernel. Events may also be provided by Windows services and kernel level drivers.

The sensors 500 may include file operation sensor 502 (including CD/DVD burn sensor 510), network operation sensor 504, print queue sensor 505, clipboard sensor 506, Application Programming Interface (API) spy sensor 508 and other sensors such as process spy 509.

Data collected with an event depends on the event type, but can include:

- For invoked applications, the identity of the invoking process, executable name, start time, end time, and process owner
- For user operations, such as log on or log off, the time and user identification (ID)
- For file operations, source/destination file name, operation type (open, write, delete, rename, move to recycle bin), device type, first and last access time
- For network operations, source/destination address, port and host names, start/end time stamp, bytes sent and received, inbound and outbound data transmission times
- For CD-RW operations, file names, start/end times and amount of data transferred
- For printing operations, full path or file name, event start time or print job name
- For clipboard operations, destination process ID, event start time, full path of filename involved
- For other high level operations, such as access to removable storage media, file name, device ID, time of day, bytes transferred, and the like An approved file filter 520 operates to automatically filter the dozens of inconsequential events generated by standard calls to system files. For example, it is quite common for many different .EXE and .DLL operating system files to be opened and accessed repeatedly in a typical executing Microsoft Windows application. In order to reduce the data flow to the journaling server 104-2, the file filter 520 uses an approved file list 522 to filter atomic (raw) sensor events 510.

The approved file list 522 may be implemented as a list of file names associated with events. However, in a preferred embodiment, the well known MD5 algorithm is used to generate a hash code for each file name. The MD5 hash code for a filename associated with an event is then matched against the approved list 522, rather than the complete file handle, to speed up the filtering process. Thus, only events associated with unapproved files are passed down to the coalescing stage 530.

The next stage is an atomic event coalescing stage 530 that attempts to aggregate atomic events 510. The coalescing stage 530 further filters atomic events 510 associated with or related to a single user action between the agent 300 and the Digital Guardian server 104. In general, applications frequently read small chunks of a file and not the entire file at the same time. For example, a user may open a 2 MegaByte (MB) spreadsheet file. However the OS may at a given time actually only access chunks of the spreadsheet file that are much smaller than that, such as 5 or 10 KiloBytes (KB) at a time. Thus, a typical pattern of access is to see a file open atomic event, followed by multiple read atomic events to the same file. If this sequence of atomic events is seen from the same process and the same executable with the same thread ID and the same file handle, event coalescing 530 will thus count only a single "FileOpen" event. In a preferred embodiment, there is a time attribute associated with event coalescing 530 such that if a time limit typically measuring in minutes of time is exceeded, at least one event will be reported between raw level events.

Figure 4B:
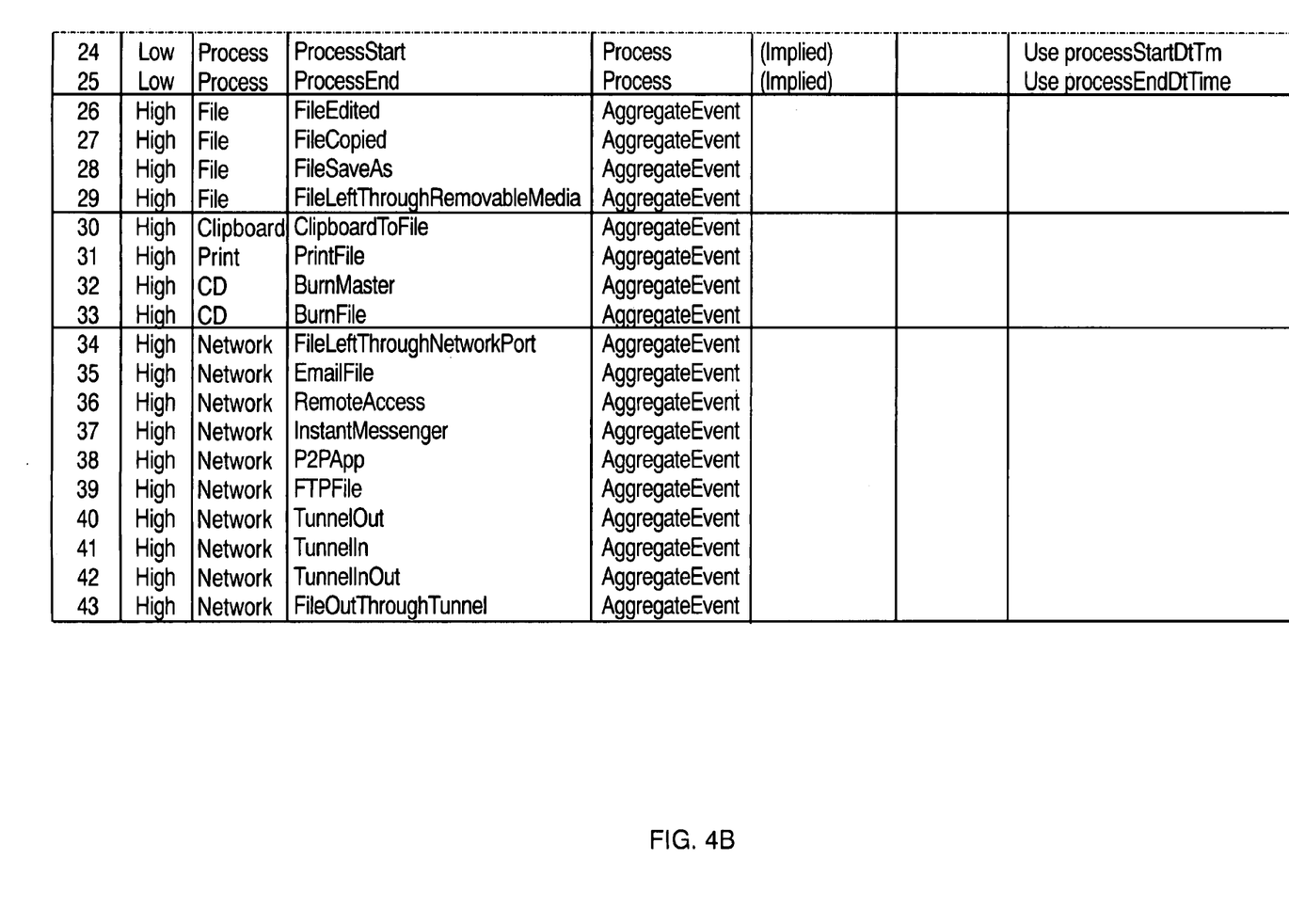

A comprehensive list of typical low level atomic events and high level event patterns is shown in FIGS. 4A and 4B. For example, 43 different action types, some of which are low level atomic events and others which are high level aggregate events, are defined in the preferred embodiment. A given event is composed of several fields in the database, including perhaps an action type 571, level 572, event category 573, event name 574, event table ID 575, action detail 576, action detail value 577, and discriminants 578.

Event categories are associated with each event type. For example, in an event category "file", event names include file read, file write, file rewrite, file copy, file rename, file delete, file move, file recycle, file restore. Similarly, network related events are TCP/IP inbound, TCP/IP outbound, USB inbound and so forth.

A scope is also associated with each event type. A scope is defined as either being a thread, process, login, machine, or all type scope. For example, "process" scope is an event that is consolidated into a high level event in the same process but not necessarily executing the same thread. "Machine" means that a reboot could occur between two events that occurred on the same machine.

Attributes commonly recorded for all high level events include an action type, an event count, bytes read count, bytes written count, event start, event end, and other possible actions. Source and destination hold numerous other attributes including the file, path, process, thread, and application identifying information that performed the event.

Other types of system events may include print events, disk write events, clipboard, user and machine events. The final type of low level event may be process events including process start and process end.

High level aggregate events are created by detecting a combination of the occurrence of low level events. More particularly, a high level aggregate event (action types 26-42) is determined after seeing a specific sequence of lower level events (action types 1-25). For example, action type 26 is a high level event called "FileEdited". This is an aggregate event that determines when a file has been edited. As the table indicates, the high level event aggregation process 570 may detect that a particular process, thread, and file has performed one or more reads to a particular file handle, followed by a write operation to the same process, thread and file handle. The event is then defined as an aggregate "File Edited" event.

Aggregate events are defined in greater detail in FIGS. 5A, 5B, 5C and 5D. For example, a "Clipboard to File" aggregate event 510 is defined as detecting a clipboard cut or copy followed by a clipboard paste to file operation.

Similarly, a "BurnFile" event is associated with detecting a CD write atomic event followed by a file read atomic event. Thus, if a series of file reads are detected from one file handle, followed by a series of CD write events with the same process, the application is recognized as having written a file to a CD-RW.

Figure 5A:
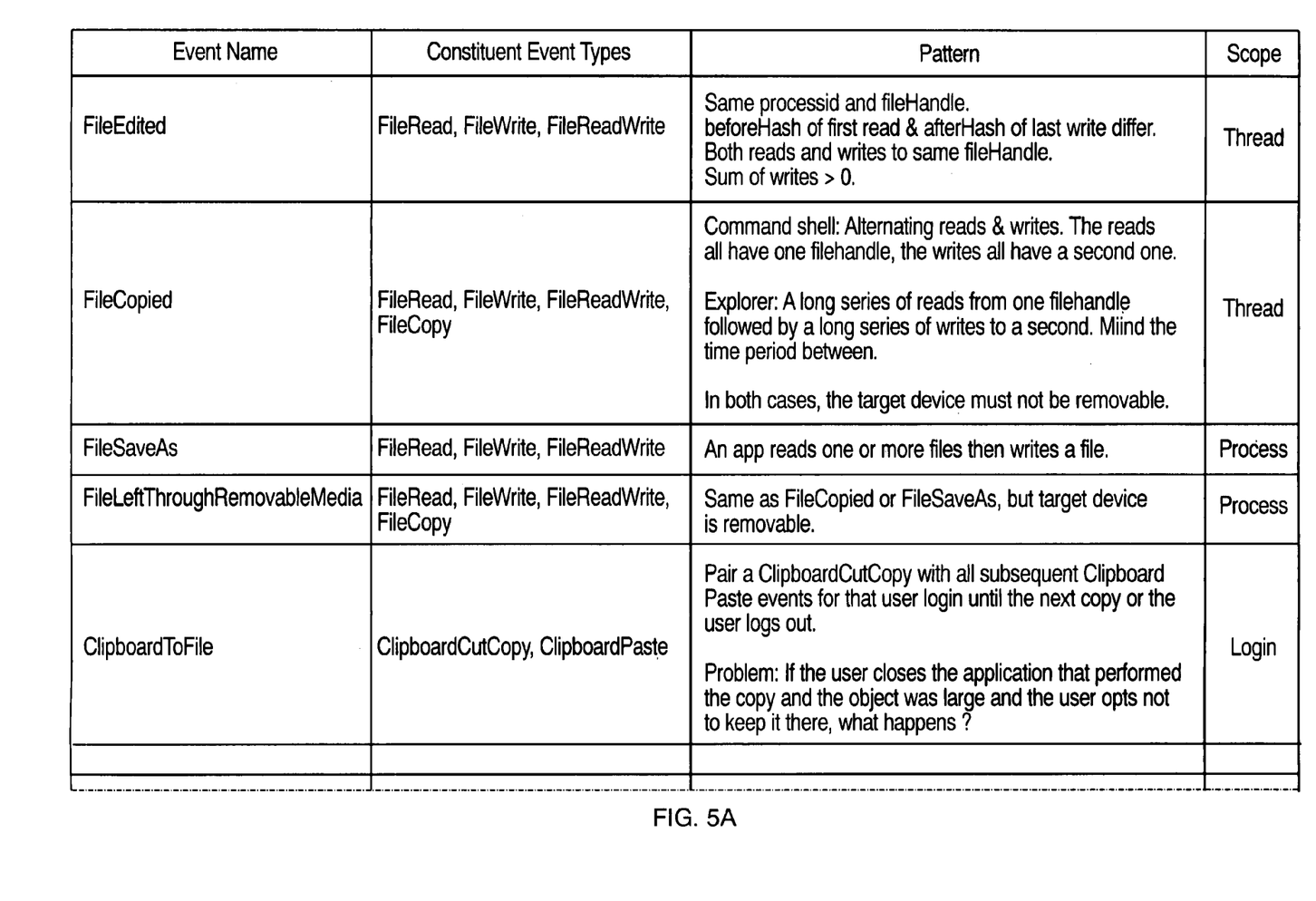
FIGS. 5A-5D are a table of higher level aggregate events.
Figure 5B:
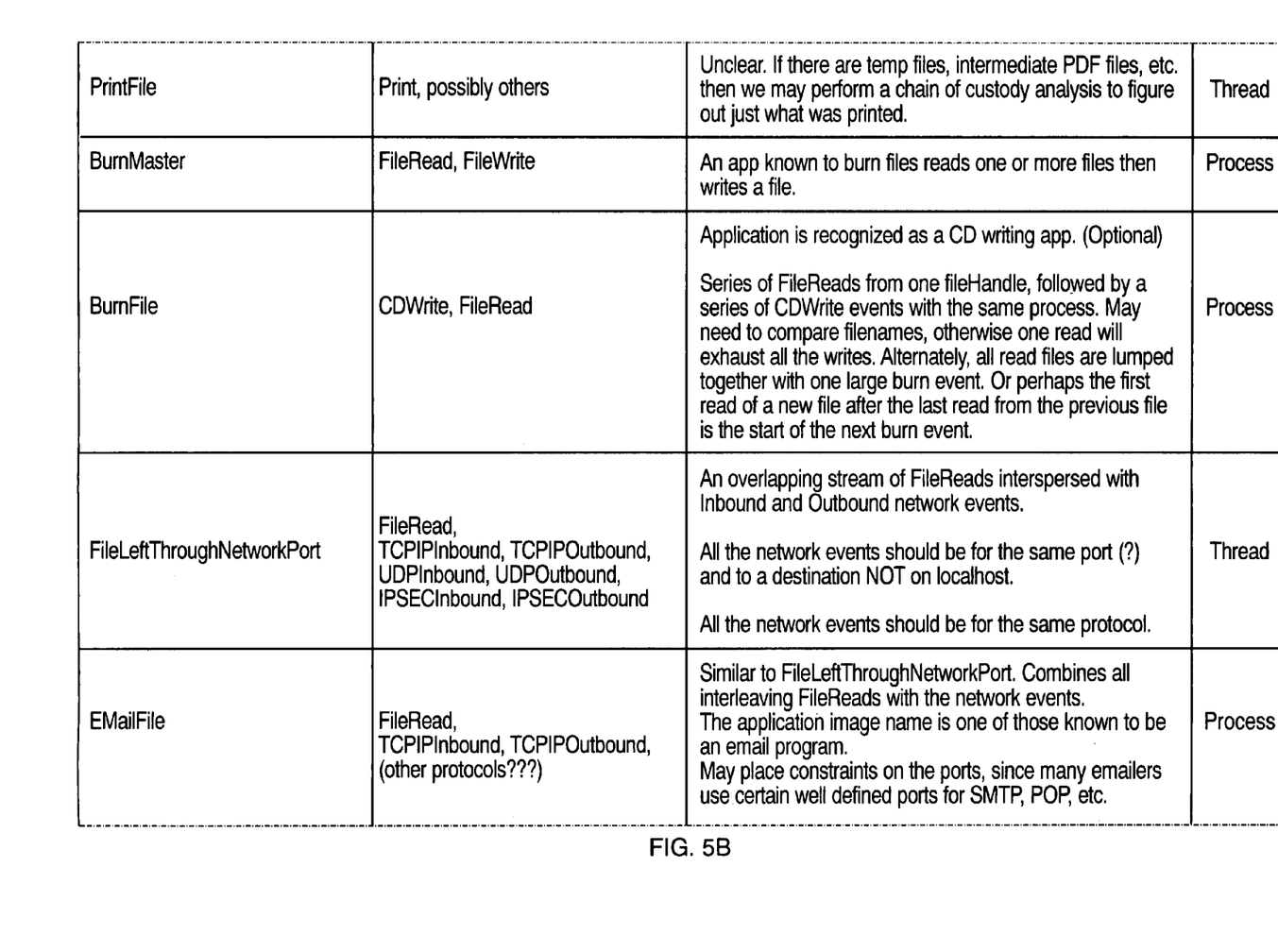
Figure 5C:
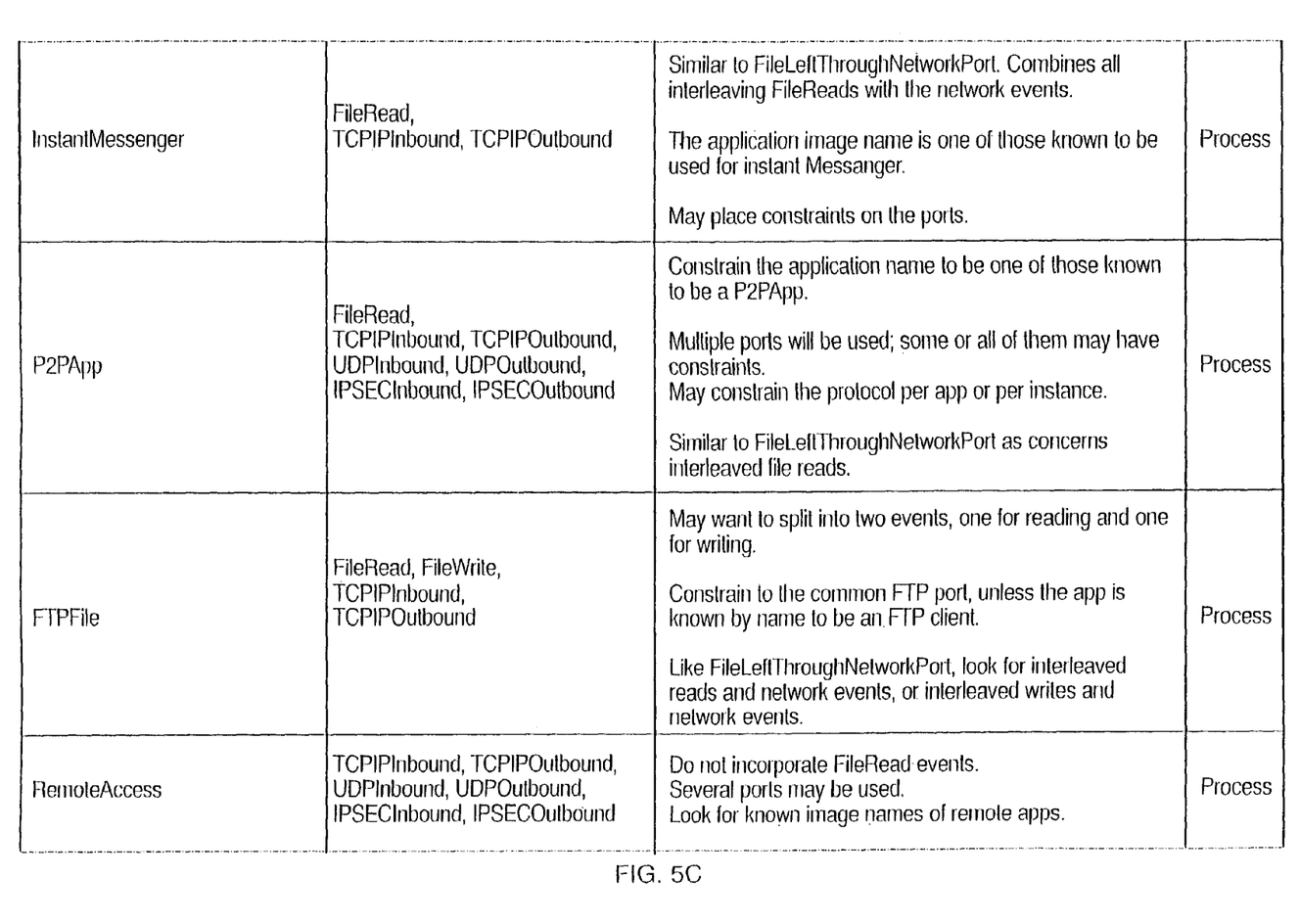
Figure 5D:
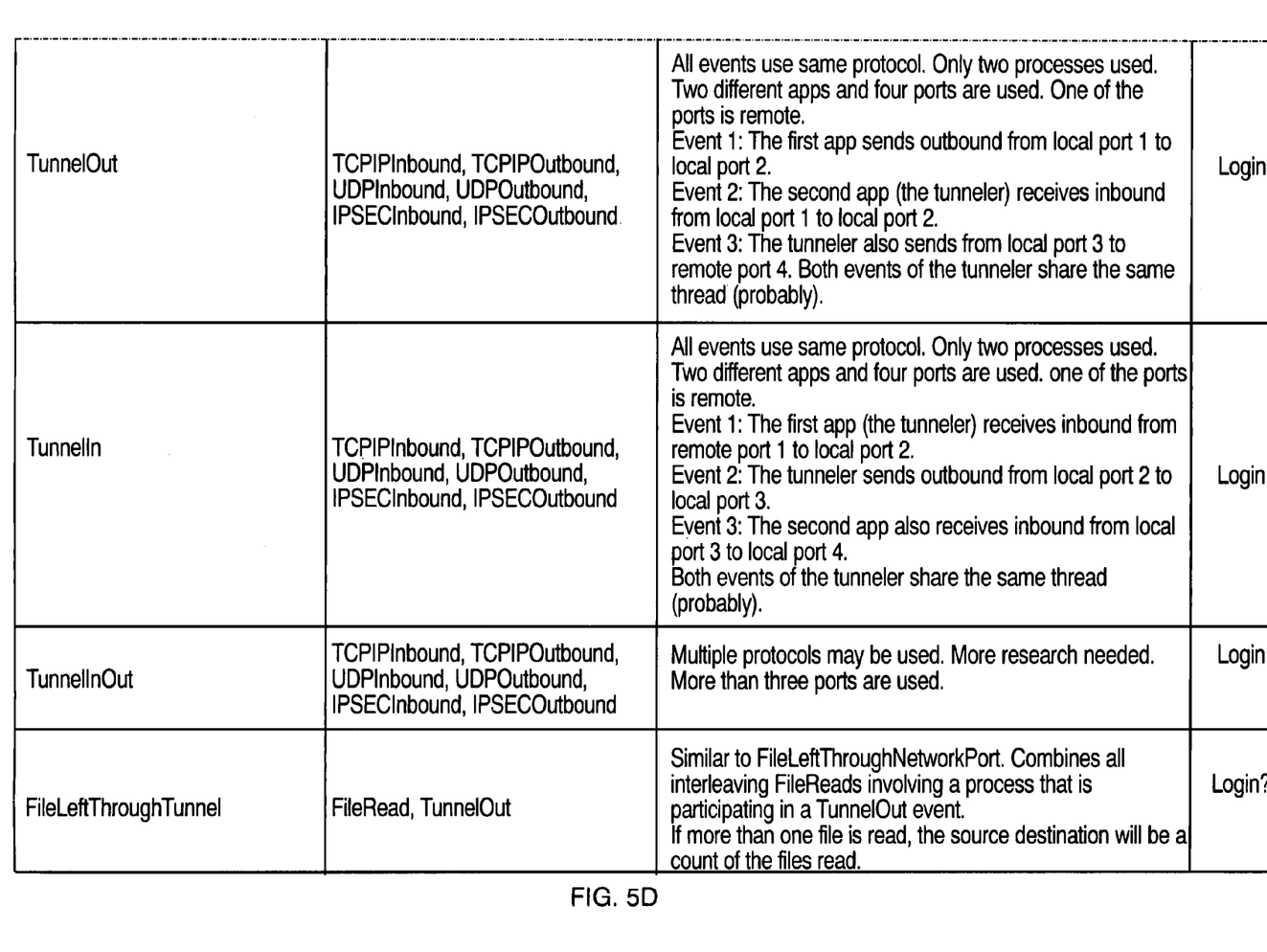

Numerous other aggregate events are possible; the list in FIGS. 5A, 5B and 5C is only meant to illustrate a few of the many possibilities.

An event bus 580 serves to distribute if one or more aggregate events to predicate rules 585-1, . . . , 585-n. An event cache 582 may also share events occurring during a certain time interval for use by the predicates 585. Events are thus fed to one or more predicates 585, which serve to implement policy logic. As one example of a predicate, logic might be implemented to block peer-to-peer file transfer applications. A predicate 585-n can thus be developed to detect a "network open" event followed by a "read hard disk drive" event. As mentioned previously, the code to implement predicates 585 is typically downloaded from the Digital Guardian server 104-2, such as driving a user 100 boot process.

Another example of a multi-event control predicate 585 would be to prevent files that originate from a specific server from being removed from that machine. This involves placing the files on a tracking list to watch for all derivative file re-names, copies, etc, and remembering these derivative names as well as the where a user first identifies source when removal actions are attempted.

Another predicate 585 can be used for blocking of a file, or a series of files from being burned to CD/DVD. The process of burning files is a multi step process, to the file burning application of choice which file to burn, and then an actual attempt to burn them. So, a series of small file reads occur, followed by writing to a temporary file for buffering of data, followed by the actual burn operation.

When predicates 585-n detect a policy violation, notification is given to a policy enforcement engine 590. The policy enforcement engine 590 then takes steps to enforce the policies as represented by the predicate 585 at the point of use—that is, within the user kernel. One such enforcement mechanism may be via kernel IRP control. Thus, events that result in an IRP request may be intercepted by the kernel and examined by the policy enforcement engine 590. If the requested IRP is not a violation, then the policy enforcement engine 590, through the IRP filer 595, allows the requested action to proceed.

However, if the requested action is a potential policy violation, then the policy engine 590 will take additional appropriate actions. These may include a number of actions 600, such as having the OS fail the IRP, such as action 601. The user and/or application thus interpret this as a failure of the specific operating system service or hardware device implicated in the request.

However, other types of actions can take place. For example, the operating system may generate a usual warning to the user that the requested action violates policy. This can occur by sending a message but then allowing the request to continue, as in a warn action 602.

A warn-requiring-reason action 603 is similar, but also requires the user to provide input to document the reason for the policy violation.

In a notify-block action 604, the user is notified that the request violated a policy and the action is blocked.

Finally, in a server alert action 605, an alert may be given to the journaling server 104-2 to indicate that the policy has been violated, providing additional information such as the identification of the user, the files involved and so forth.

It can now thus be seen how actions 600 which may occur as a result of the policy enforcement engine 590 may have a range of severities including simply failing the request, allowing the request to continue but logging the event, prompting the user for information as to why the policy is about to be violated and/or prompting with other restrictive and/or permission requesting notices.

Figure 6:
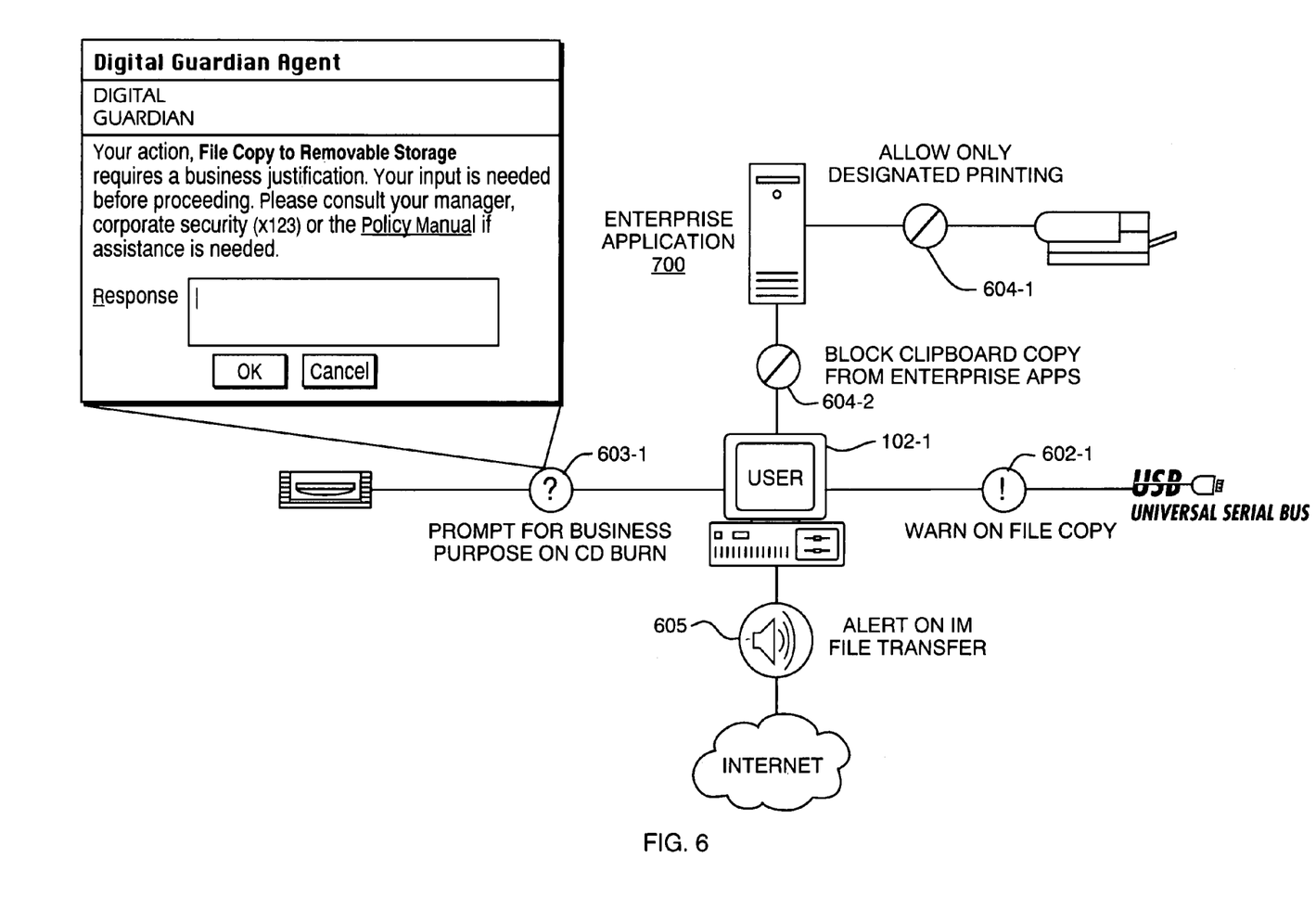
FIG. 6 illustrates point of use policy enforcement.

FIG. 6 is an illustration showing how the policy enforcement engine 590 may implement a specific action 602, warn-requiring-reason 603, notify-block 604 and alert-action 605. For example, an enterprise policy may allow only designated types of printing to occur from a particular enterprise application 700. This policy is appropriately implemented with a notify-block action 604. The action 604 then blocks a requested print that falls outside of allowed policies.

Similarly, a block clipboard copy action 604-2 can be implemented to prevent clipboard copy operations from originating inside enterprise application 700.

A warn-on-file-copy action 602-1 has also been implemented which warns a user 102-1 when attempting to copy a file to a USB type device. The warn action 602-1 can send a message to the user but then allow the copy request to continue.

A policy may also be implemented to implement a warn-requiring-reason action 603-1 to prompt for a business purpose when a user attempts to burn a file to a CD. The action 603-1 causes a notice box 622 to be displayed at the user 102-1 requiring a response. Once the box is completed with a reason for the policy violation, the burn request is allowed to continue.

Finally, an alert action 605 may be implemented to control Instant Messaging (IM) file transfers. Here, information relating to the attempted activity can be provided to the journaling server 104-2 to indicate that the policy has been violated providing additional information, such as identification of the user, the files involved and so forth, in a way that is completely transparent to the user.

The policy enforcement engine 590 can also implement other policy schemes. For example, it may tally violations and take appropriate actions according to a "demerit" procedure. For example, one of the predicates 585 may be a demerit predicate that counts the number of times that a particular user attempts to violate a security policy. The demerit system can thus be used to determine when a user is attempting to "hoard" digital assets. For example, a user may be detected as opening or copying many files in a very short time period such as a day. If the source is a network share location and the user has for example copied greater than 100 MegaBytes (MB) in a single day, and counting predicate violations can rise to a more severe system report and denial of further usage.

With this system of actions, the applications and/or user do not necessarily know what is happening. That is, actions can be taken entirely with the operating system kernel which simply denies the IRP.

If the user confirms an action, this may also be used to provide evidence of the user's intent in a later analysis of a situation where valuable assets have been misappropriated.

While this invention has been particularly shown and described with references to preferred embodiments thereof, it will be understood by those skilled in the art that various changes in form and details may be made therein without departing from the scope of the invention encompassed by the appended claims.

What is claimed is:

1. An agent process for controlling access to digital assets in a network of data processing devices, the process comprising:
    defining a security perimeter that includes two or more data processing devices in the network, each of the data processing devices including an operating system kernel, and at least one of the data processing devices being a user client device having access to a digital asset;
    defining one or more policy violation predicates implementing policy logic to control access to the digital asset by an end user of the user client device;
    sensing atomic events within the operating system kernel of the user client device, the atomic events being low level kernel events and being sensed upon actions relating to authorized access to the digital asset by the end user of the user client device;
    aggregating multiple atomic level events sensed within the user client device to determine a combined event; and
    asserting a policy violation predicate, at the user client device, upon an occurrence of a combined event that violates the policy logic, the policy logic violation corresponding to a risk of use of the digital asset outside of the security perimeter.

2. A process as in claim 1 wherein the step of asserting the policy violation predicate is implemented in the operating system kernel of the client user device.

3. A process as in claim 1 additionally comprising:
    preventing a user from accessing the digital asset if the policy predicate indicates a violated policy.

4. A process as in claim 3 wherein the preventing step includes an IRP intercept.

5. A process as in claim 1 wherein the combined event is a time sequence of multiple atomic level events.

6. A process as in claim 1 additionally comprising:
    prompting a user to document a reason for a policy violation, prior to granting access to the digital asset.

7. A process as in claim 1 additionally comprising:
    asserting multiple policy violation predicates prior to indicating a risk of use of the digital asset outside of the security perimeter.

8. A process as in claim 2 that operates independently of application software.

9. A process as in claim 1 additionally comprising:
    notifying a user of a policy violation, and then permitting access to the digital asset.

10. A process as in claim 2 wherein the sensing, aggregating, and asserting steps operate in real time.

11. A process as in claim 1 additionally comprising:
    determining the identity of a particular file in the asset access event.

12. A system for controlling access to digital assets in a network of data processing devices, the system comprising:
    a digital asset usage policy server storing one or more digital asset usage policies programmed to be applied to a security perimeter, the security perimeter comprising two or more data processing devices, each of the data processing devices including an operating system kernel, at least one of the data processing devices being a user client device having access to a digital asset, and the one or more digital asset usage policies implementing policy logic to control access to the digital asset by an end user of the user client device;
    an atomic event sensor, the sensor located within the operating system kernel within the user client device and programmed to sense atomic events within the operating system kernel, the atomic events being low level kernel events and being sensed by the sensor upon actions relating to authorized access to the digital asset by the end user of the user client device;
    an atomic level event aggregator programmed to determine the occurrence of an aggregate event that comprises more than one atomic level asset access event sensed within the user client device; and
    a policy violation detector programmed to determine whether an aggregate event has occurred that violates the policy logic, the policy logic violation corresponding to a risk of use of the digital asset outside the security perimeter.

13. A system as in claim 12 wherein the policy violation detector is located in the operating system kernel of the user client device.

14. A system as in claim 12 wherein the policy violation detector is programmed to determine a violated policy type.

15. A system as in claim 14 wherein the policy violation detector includes an IRP intercept.

16. A system as in claim 12 wherein the combined event is a time sequence of multiple atomic level events.

17. A system as in claim 12 further including a user interface within the client device programmed to require the end user to document a reason for a policy violation prior to granting access to the digital asset.

18. A system as in claim 12 wherein the policy violation detector is additionally programmed to assert multiple policy violation predicates prior to indicating a risk of use of the digital asset outside of the security perimeter.

19. A system as in claim 13 that is programmed to operate independently of application software.

20. A system as in claim 12 wherein the user client device includes a user interface programmed to notify the end user of a policy violation and to permit access to the digital asset once a reason for the violation is provided by the end user.

21. A system as in claim 12 wherein the sensor, aggregator and detector are programmed to operate in real time.

22. A system as in claim 12 wherein the detector is additionally programmed to determine the identity of a particular file in the atomic level asset event.

* * * * *